(No Model.) 2 Sheets—Sheet 1.

H. W. ATWATER.
ICE CREAM FREEZER.

No. 479,931. Patented Aug. 2, 1892.

Witnesses
Oscar A. Michel
J. C. Hawks

Inventor:
Henry W. Atwater,
By Drake & Co., Atty's.

(No Model.) 2 Sheets—Sheet 2.

H. W. ATWATER.
ICE CREAM FREEZER.

No. 479,931. Patented Aug. 2, 1892.

Witnesses
Oscar A. Michel
J. C. Hanks

Inventor:
Henry W. Atwater,
By Drake & Co. Atty's.

UNITED STATES PATENT OFFICE.

HENRY W. ATWATER, OF EAST ORANGE, NEW JERSEY.

ICE-CREAM FREEZER.

SPECIFICATION forming part of Letters Patent No. 479,931, dated August 2, 1892.

Application filed June 6, 1891. Serial No. 395,417. (No model.)

*To all whom it may concern:*

Be it known that I, HENRY W. ATWATER, a citizen of the United States, residing at East Orange, in the county of Essex and State of New Jersey, have invented certain new and useful Improvements in Refrigerators and Freezers for Ice-Cream, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates more particularly to certain improvements in that class of ice-cream freezers or refrigerating apparatus having rotary freezing-cylinders adapted to contain the refrigerant or freezing mixture and to be brought at its outside periphery into contact with the cream or mixture to be frozen. The process is applicable, however, to refrigerating and freezing apparatus of very different constructions and methods of operation.

The objects of the invention are to enable a better quality of ice-cream to be obtained where the device is employed as an ice-cream freezer; to reduce the cost of construction; to render the device more convenient and handy, and to secure other advantages and results, some of which will be disclosed in connection with the descriptions of the working parts.

The invention consists in the improved ice-cream freezer or refrigerating apparatus, in the arrangements and combinations of parts thereof, and in the method or process of ice-cream making, all substantially as will be hereinafter set forth, and finally embodied in the clauses of the claim.

Figure 1:
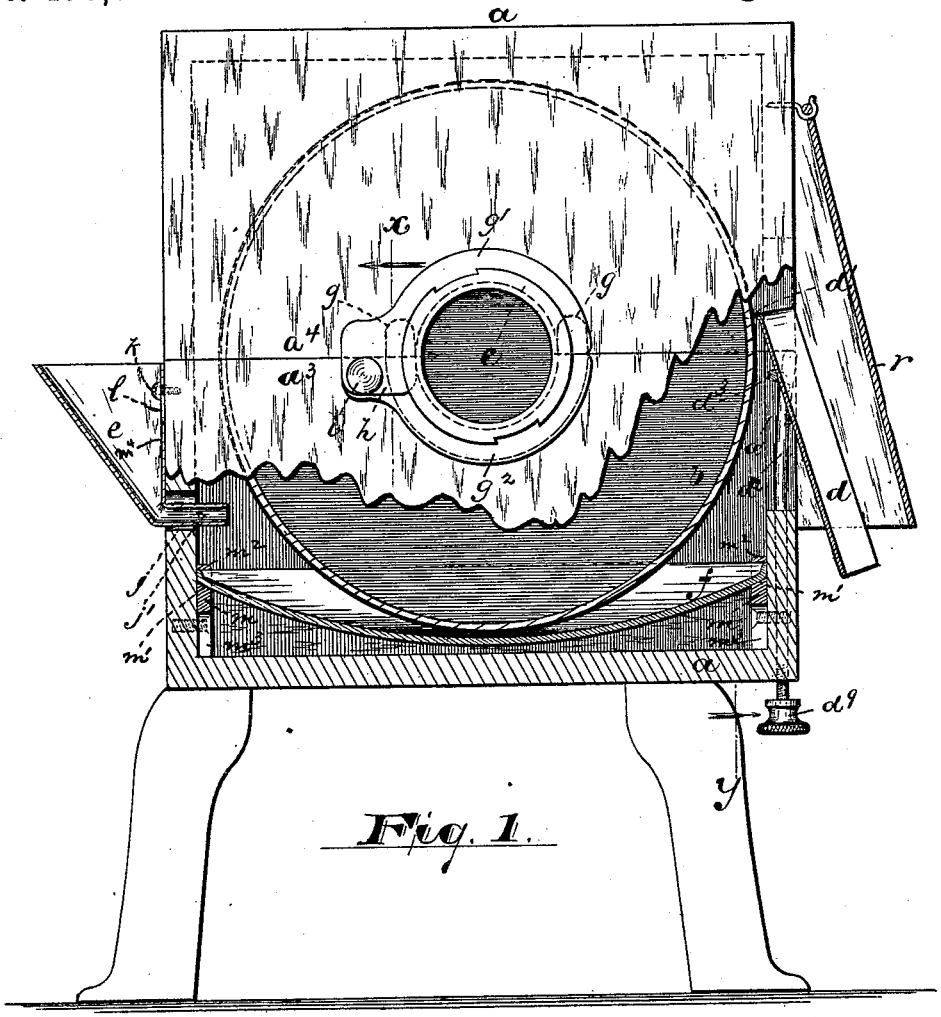
Figure 2:
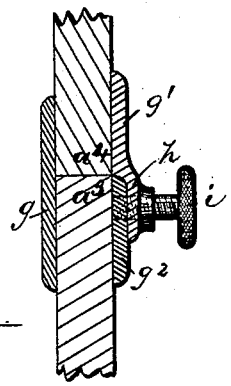
Figure 3:
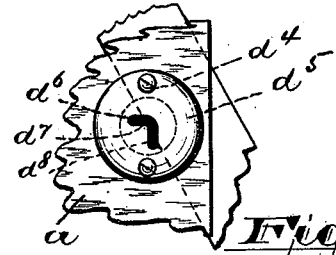
Figure 4:
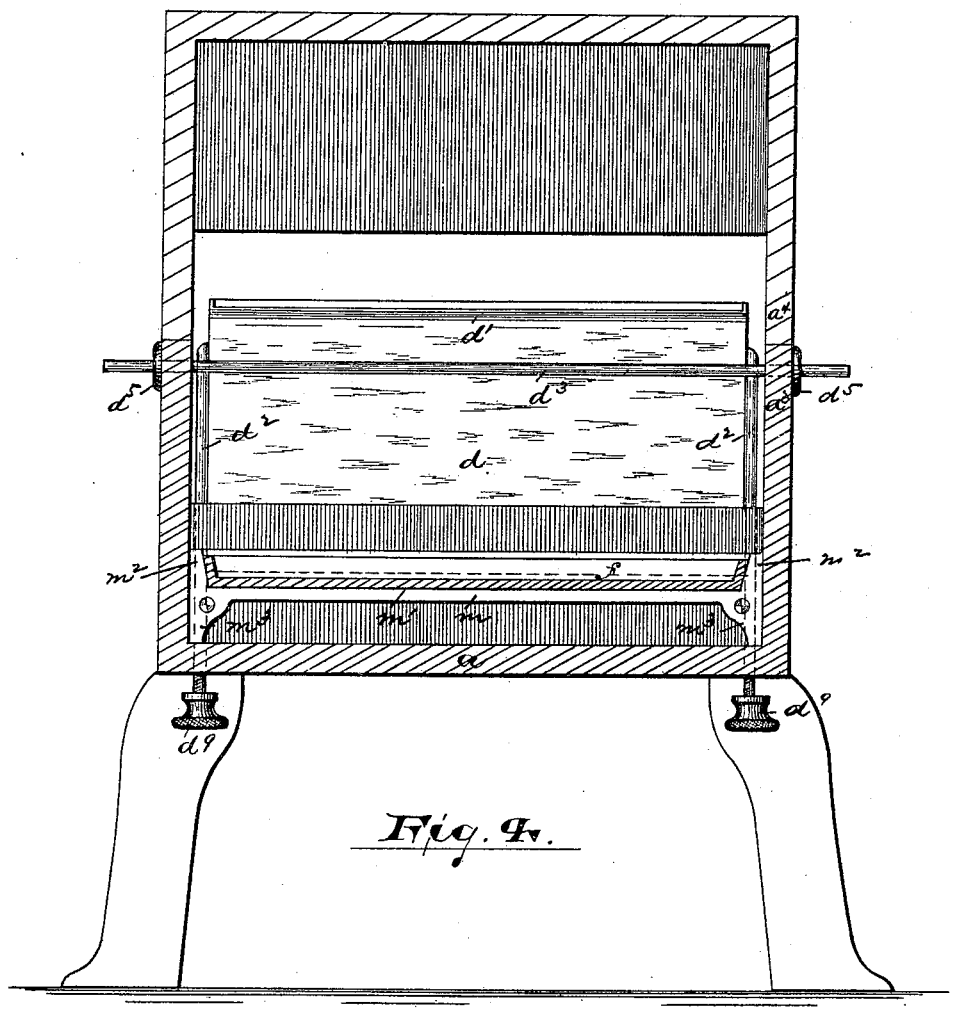
Figure 5:
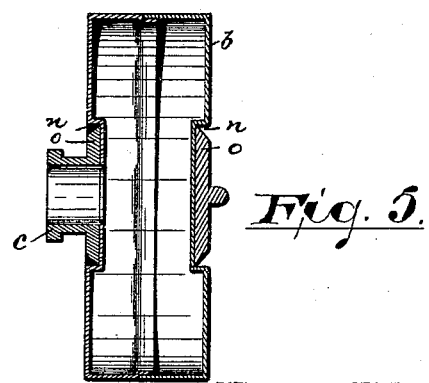

Referring to the accompanying drawings, in which like letters indicate corresponding parts in each of the several figures, Figure 1 is a side elevation, partly in section, of the improved device, the sectional parts illustrating the arrangements of the internal mechanisms. Fig. 2 is a sectional detail taken on line $x$. Fig. 3 is a side view in detail of a bearing for a certain rod for separating the scraper from the freezing-surface. Fig. 4 is a section taken on line $y$; and Fig. 5 is a detail section of the freezing-cylinder, showing the construction of the same.

The sectional views are taken in the directions indicated by the arrows.

In said drawings, $a$ indicates an inclosure or case, preferably of wood or other non-conductor of heat, within which is arranged a metal cylinder $b$ or a cylinder of a material which is a good conductor of heat, the said cylinder being at a suitable point therein provided with an opening or openings, through which the ice and salt or other refrigerant are introduced thereto the said opening being preferably through the hollow journal $c$ at one side of the cylinder, where it will lead to the exterior of the case. Thus the refrigerant cannot come into contact with the contents of the case undergoing the process of freezing. The hollow journal and the means employed for closing the opening therethrough and for turning the cylinder in its bearings are or may be substantially the same as those disclosed in the Patent to J. A. Burns, No. 431,645, dated July 8, 1890. At one end of the case $a$ the same is open, as at $a'$, and a chute $d$ is arranged thereat on suitable bearings or supports $d^2$, one end of which said chute engages the periphery of the cylinder, as at $d'$, and forms a scraper for removing the frozen cream or other congealed matter therefrom when the said cylinder is turned by the operator in the manner heretofore described in the patent above referred to.

In the devices heretofore in use the freezing mechanisms and operations have been defective, in that the scraper during the freezing and cutting-off processes came in contact directly with the metallic surface, abrading or scraping the same while removing the congealed matter, and thus removing metallic particles with said matter or oxide or salts which may have been formed on said surface, so that the purity and value of the cream was materially impaired or reduced.

In the present device the scraper $d'$ is made adjustable in its relation to the cylinder—that is to say, means are provided for positively holding the scraper both into and out of scraping engagement. The spring-supports $d^2$ perform the function of securing a contact and positive pressure of the scraper on the periphery, and what I may term a "separator" $d^3$ serves the second function of holding the adjustable scraper away from said periphery, so that liquid—such as water—may be allowed to freeze upon the said periphery without interference or disturbance on account of the scraper in accordance with the process of freezing cream, hereinafter described.

The separator $d^3$, which I prefer to employ in connection with the separable scraper, is a simple straight rod, which is readily removable from its bearings. I prefer this construction over cams, eccentrics, or other means more complex, because of the facility with which it may be cleansed from cream or milk after service, because of the cheapness of its construction, and because of the ease with which it may be removed from its bearings. The said rod has its bearings in the side walls of the case $a$, the latter being slotted to receive the said rod and admit of a slight movement thereof from and toward the cylinder. The peculiar bearings preferred are shown in detail in Fig. 3, where the side wall is shown to be perforated with an ordinary auger or bit hole, over which is secured by screws $d^4$ a plate $d^5$, having the slot $d^6$ for the separating-rod. Said slot is angular in form, as indicated, the portion $d^7$ receiving the rod when the latter is not serving to hold the scraper away from the freezing-surface and the lower portion $d^8$ being located to receive the rod and hold it against the scraper and the latter away from the said freezing-surface, all as will be well understood. As before indicated, the rod may be provided with an eccentric projection of some sort or kind, and be thus adapted to force the scraper away by a simple pivotal movement of the rod, or other means of separating may be employed without departing from the scope of the invention. Again, the separator may be adjusted in its relation to the freezer by moving said scraper against a stationary separator. This may be performed by lowering the inclined chute or scraper by means of adjusting-screws $d^9$, which may be employed for drawing the chute downward. They may be employed, also, for changing the relation of the chute and cylinder to vary the spring-power or for other purposes.

To secure the greatest economy in the consumption of cream or to prevent wastage because of the cream remaining in small quantity out of reach of the cylinder, I have constructed the pan $f$ with a continuously-curved or segmental bottom without an angle or flatness at the center. Thus all the cream is brought to the point of nearest approach to the cylinder, where it will be most easily taken up.

To enable the cylinder to be inserted in its bearings with the greatest facility and convenience, to enable sheet metal to be used as the upper section of the case, and yet secure a firm and durable bearing for the cylinder, and where wood is employed as the body material of the upper and lower sections of the case to secure a metallic bearing for the journals and with the same castings provide keepers or guides, and thus dispense with the expense of valances and the like, and to avoid the objections attending the use of dowels, I have provided the sections $a^3$ $a^4$ of the case at the journal-bearings for the cylinder with keeper-plates $g$ $g'$ $g^2$, which coöperate with the journals of the cylinder in holding said sections in proper relation with one another and with said cylinder to keep the case closed. Said keepers consist of plates, (shown more clearly in Figs. 1 and 2,) the inner ones $g$ of which are secured to section $a^3$ at the semicircular aperture in the edges thereof and project at opposite sides of the journal above the edges of the said section, so as to stay the upper section $a^4$ against lateral displacement. The upper curved edges of the said plates $g$ serve, also, as bearings for the journals of the cylinder. On the outer sides of the section $a^4$ are other keeper-plates $g'$ $g^2$, secured, respectively, on the upper and lower sections, one of which is provided with a lug, lip, or tongue $h$, which overlaps a portion of the plate $g^2$ and is provided with a set-screw $i$ or other form of fastener for holding the upper case-section down in place. It will be understood that set-screws and keepers are employed on both sides of the case. Longitudinal movement is prevented by the journal $c$, lying in the semicircular apertures of both the case-sections, in addition to the power exerted by the set-screws, as will be evident. The set-screw may or may not pass into the plate $g^2$, but the former method is preferred. By simply unscrewing the set-screw the upper case-section $a^4$ may be removed with greater ease than when ordinary wooden dowels are employed in the edges of the said sections, and the device is rendered more simple in construction and less costly.

A further improvement in the freezer consists in the means employed for holding the supply-funnel $e$ in place and allowing the same to be quickly removed. These consist in forming the hole $j$ for the spout $j'$ larger than said spout, so that there will be a limited space for play therein, and in providing a hook or, preferably, a headed screw $k$ at the end of the case-section above said hole. Said hook enters an eye $l$ in the flat side $m^4$ of the funnel and catches and holds the funnel in proper position, as will be understood upon reference to Fig. 1. Thus by simply inserting the spout in the hole $j$ and lowering the funnel into holding relation with the screw or hook the funnel will be in proper position to receive the cream to be frozen.

To further reduce the cost of construction and facilitate manufacture and at the same time provide a convenient support for the pan $f$, I have provided cleats $m$ on the interior of the case at the ends thereof, as shown in Figs. 1 and 4. These are of a width coincident with the width of the case and serve or may serve as guides in spacing the sides of the case when manufacturing the same. The said cleats are provided at their upper edges with bearings $m'$ to engage the convex under side of the pan and hold the uplifted ends in place, with lateral bearings $m^2$ to hold the pan away from the sides of the case and prevent the lubricant from the journals from falling into the pan, and with legs $m^3$ to hold the cleat up a proper distance from the bottom of the case, all as will be understood.

The opening $a'$ is provided with a pivoted and separable cap $v$, which may be of tin or tin-lined or otherwise provided with a layer which is a non-conductor of heat in any suitable manner. This said cap serves to prevent indrafts of warm air against the cylinder. The cap may be attached to the case by hooks and eyes, which allow of detachment or of a pivotal operation.

The freezing-cylinder (shown in sectional detail in Fig. 5) may and preferably is in two parts stamped or formed from tin or other sheet metal and joined by solder at the periphery. At the pivotal centers of the said sections the same are recessed, as at $n$, to receive the flanged journals, the shallow recesses being made in the sides or end plates of the cylinder-sections at the centers thereof and of a diameter and depth equal to that of the flanges $o$ to fit the flanges $o$ with nicety, so that the journals will be centered with exactness, causing the cylinder to run true in its relation to co-operating mechanisms without care or expense of time in assembling the parts, and the bottom of the recesses, which lie in vertical planes parallel with the planes of the end faces of said cylinder, serving as sets against which the flanges bear and are held against inward movement and so that the outer faces of the flanges lie substantially flush with the faces of the ends of the cylinder, as will be understood. The shallow bottoms of the end or side recesses limits the inward movements of the flanges and causes them to lie flush with parts of the sides or end plates nearer the periphery, as will be understood. They also serve to hold the solder and to provide bearings which guide the workman in centering the journals. After insertion the flanges $o$ are soldered in said recesses, and the parts are thus united with strength and neatness.

In carrying out the invention, after introducing the refrigerating or freezing mixture to the cylinder I pour a small quantity of water through the funnel $e$ into the pan $f$ and force the scraper back from the cylinder, as described. I then turn the cylinder slowly, bringing the cold periphery into contact with the water lying in the pan and gradually form a thin layer of solid ice-crystal on the periphery, which will not be disturbed or removed by the scraper, but will protect the metallic periphery, so that no metallic particles or oxides or salts of the metal will be scraped off into the cream. The water having been taken up by the cylinder, the liquid cream or other liquid to be frozen is poured into the pan and a layer of ice-cream frozen on the iced surface of the cylinder. The scraper is then brought into contact with the said iced surface and the cream is removed thereby as the cylinder is turned, the layer of water-ice remaining solid and intact. The texture of the cream, and also that of water-ices, sherbets, and similar ices containing fruit-juices, sugar, and other ingredients, is materially different from that of frozen water alone, the texture of the former being soft and readily removable from the cylinder, while, on the contrary, the texture of the ice or frozen water is close, brittle, and hard, clinging to the cylinder with great tenacity, so that the scraper has no effect on it, either to force it in cakes or layers bodily from the cylinder or to scrape the surface and remove it by degrees. Thus the scraper, having a given degree of pressure, will remove the soft cream, sherbets, or ices, while the protecting-layer of ice will remain unchanged or materially unaffected by the said scraper during all the operation of manufacturing the said cream, sherbets, or ices.

I am aware that various changes may be made in the construction without departing from the invention.

Having thus described the invention, what I claim as new is—

1. The process herein described of manufacturing ice-cream, water-ices, and the like, which consists in freezing a coating upon the ice-cream or water-ice freezing devices prior to freezing said ice-cream or water-ice thereon, the said preliminary coating being of a harder texture than said ice-cream or water-ice, and then freezing said cream, water-ice, or similar product upon said preliminary coating, substantially as set forth.

2. The process herein described, which consists in freezing a layer of ice of one degree of hardness upon a suitable surface and then freezing upon the frozen ice a mixture which when congealed is softer than said ice and removable from said ice without materially affecting the same.

3. The combination of a freezing-cylinder $b$, adapted to contain a freezing mixture, a scraper, and a rod $d^3$, interposed between the scraper and freezing-surface and movable away from said freezing-surface with said scraper to force the scraper edge from contact with the cylinder, the opposite ends of said rod being free to be grasped by the hand to give the desired movement, substantially as set forth.

4. The combination, with the case $a$ and freezing-cylinder, of a chute $d'$, held into engagement with said cylinder by spring-power, and a rod $d^3$, having bearings at the opposite sides of said case and extending between the chute and cylinder into engagement with said chute and adapted to be grasped by the hands and moved against the power of the springs in said bearings to force the chute from scraping-contact with the cylinder, substantially as set forth.

5. In combination with the case, freezing-cylinder, and scraper, a rod $d^3$, having bearings in said case and engaging said scraper to move the latter from scraping-contact with the cylinder, said rod being longitudinally removable from its bearings, substantially as and for the purposes set forth.

6. In combination with a suitable case or inclosure having on opposite sides thereof slots admitting of a lateral movement of a rod therein and providing bearings to hold said rod, so that the same will hold the scraper away from contact with the freezing-cylinder, said cylinder, scraper, and rod, the last being arranged in said slots and both laterally and longitudinally movable therein, substantially as set forth.

7. In combination with the case $a$, having angular slots and bearings to hold the rod $d^3$ in position to hold the scraper away from the cylinder, and a scraper-holding rod arranged in said slots, substantially as set forth.

8. In combination with the freezing-cylinder $b$, a chute $d$, and its scraper $d'$, carried by spring supports or bearings $d^2$, and adjusting-screws $d^9$, substantially as set forth.

9. In an ice-cream freezer, the combination, with the case-sections $a^3 a^4$, of plates $g$, secured to one of said sections, providing journal-bearings for the freezing-cylinder and projecting into engagement with the other of said sections to prevent lateral displacement, substantially as set forth.

10. In an ice-cream freezer, the combination, with sections $a^3 a^4$ of the case $a$, having apertures for the freezing-cylinder journals, of said freezing-cylinder having said journals and outer plates $g' g^2$, secured to the said sections at said apertures, one of which overlaps the other, and set-screws for holding or binding the plates together, all arranged and operating substantially as set forth.

11. In an ice-cream freezer, the combination, with case-sections $a^3 a^4$, of cylinder $b$, adjustable chute and scraper $d'$, pan $f$, and supply-funnel, and plates $d^5$, secured to one of said sections over holes therein and provided with slots to receive a separator-rod, and said rod adapted to separate and hold the scraper from the freezing-surface, substantially as set forth.

12. In an ice-cream freezer, a cylinder having shallow recesses at the opposite ends thereof, the bottoms of which are in vertical planes and serve as seats or bearings against which the journal-flanges are fastened, and journals having said flanges conforming to said recesses, so as to be centered thereby and fastened in said recesses, substantially as and for the purposes set forth.

In testimony that I claim the foregoing I have hereunto set my hand this 3d day of June, 1891.

HENRY W. ATWATER.

Witnesses:
CHARLES H. PELL,
OSCAR A. MICHEL.